US010445042B1

(12) United States Patent
Wang et al.

(10) Patent No.: US 10,445,042 B1
(45) Date of Patent: Oct. 15, 2019

(54) INTERFACE DEVICE AND PRINTER

(71) Applicant: TOSHIBA TEC KABUSHIKI KAISHA, Shinagawa-ku, Tokyo (JP)

(72) Inventors: Mei Yeen Wang, Singapore (SG); Toyoaki Yamaoka, Singapore (SG); Antonius Kosasih, Singapore (SG); Noriyuki Watanabe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/935,122

(22) Filed: Mar. 26, 2018

(51) Int. Cl.
*G06F 3/12* (2006.01)
*H04L 12/861* (2013.01)

(52) U.S. Cl.
CPC .......... *G06F 3/1295* (2013.01); *G06F 3/1279* (2013.01); *G06F 3/1297* (2013.01); *H04L 49/9057* (2013.01)

(58) Field of Classification Search
USPC .......................................................... 358/1.15
See application file for complete search history.

(56) References Cited

U.S. PATENT DOCUMENTS 6,321,266 B1 * 11/2001 Yokomizo .......... H04N 1/32358 358/400
8,400,662 B2 * 3/2013 Inoue ..................... G06K 15/02 358/1.1
2001/0003199 A1 * 6/2001 Maruyama ............ G06F 9/3802 711/165
2011/0158525 A1 * 6/2011 Narita ....................... G06T 9/00 382/166

FOREIGN PATENT DOCUMENTS

JP 09-254455 9/1997

OTHER PUBLICATIONS

Watanabe Maki, Printer Device; Sep. 30, 1997, Japanese Patent Publication, JP 09254455 listed on IDS, all pages. (Year: 1997).*
Inagaki et al., Data Transfer Device, Oct. 26, 2006, Machine Translated Japanese Patent Application Publication, JP 2006293969, All Pages. (Year: 2006).*

* cited by examiner

*Primary Examiner* — Ngon B Nguyen

(74) *Attorney, Agent, or Firm* — Amin, Turocy & Watson LLP

(57) ABSTRACT

In accordance with an embodiment, an interface device comprises a plurality of interface circuits which respectively corresponds to different transmission paths and sequentially acquires a plurality of packets formed by dividing data which is an object of any one of plural types of information processing via the corresponding transmission paths, a reception buffer and a processor. The processor writes the packet acquired by each of the plurality of the interface circuits in the reception buffer in association with an identification code for identifying the interface circuit acquiring the packet, sequentially reads a plurality of packets associated with the same identification code among the packets stored in the reception buffer from the reception buffer, and delivers the read packets to the information processing on the data which is a basis of the packet.

19 Claims, 2 Drawing Sheets

100
INTERFACE CIRCUIT 1
TRANSMISSION AND RECEPTION CIRCUIT 11
FIFO BUFFER 12
200
9
RECEPTION BUFFER 3
IMAGE BUFFER 4
PRINT ENGINE 5
INTERFACE CIRCUIT 2
TRANSMISSION AND RECEPTION CIRCUIT 21
FIFO BUFFER 22
300
PROCESSOR 6
MAIN MEMORY 7
INTERRUPT CONTROLLER 8

INTERFACE DEVICE AND PRINTER

FIELD

Embodiments described herein relate generally to an interface device, a printer, and methods associated therewith.

BACKGROUND

An interface device which stores data received by each of a plurality of interface circuits with a single reception buffer is known.

However, since there is only one reception buffer, once reception of the data by the one interface circuit is started, reception of data by another interface circuit cannot be started until the reception by the one interface circuit is completed. Undesired delays and/or latencies are realized by such interface devices.

DETAILED DESCRIPTION

Provided herein are a plurality of the interface circuits that can receive data in parallel while sharing a single reception buffer.

In accordance with an embodiment, an interface device comprises a plurality of interface circuits which respectively corresponds to different transmission paths and sequentially acquires a plurality of packets formed by dividing data which is an object of any one of plural types of information processing via the corresponding transmission paths, a reception buffer and a processor. The processor writes the packet acquired by each of the plurality of the interface circuits in the reception buffer in association with an identification code for identifying the interface circuit acquiring the packet, sequentially reads a plurality of packets associated with the same identification code among the packets stored in the reception buffer from the reception buffer, and delivers the read packets to the information processing on the data which is a basis of the packet.

Hereinafter, an example of an embodiment is described with reference to the accompanying drawings. In the present embodiment, a printer having a function as an interface device is described as an example.

Figure 1:
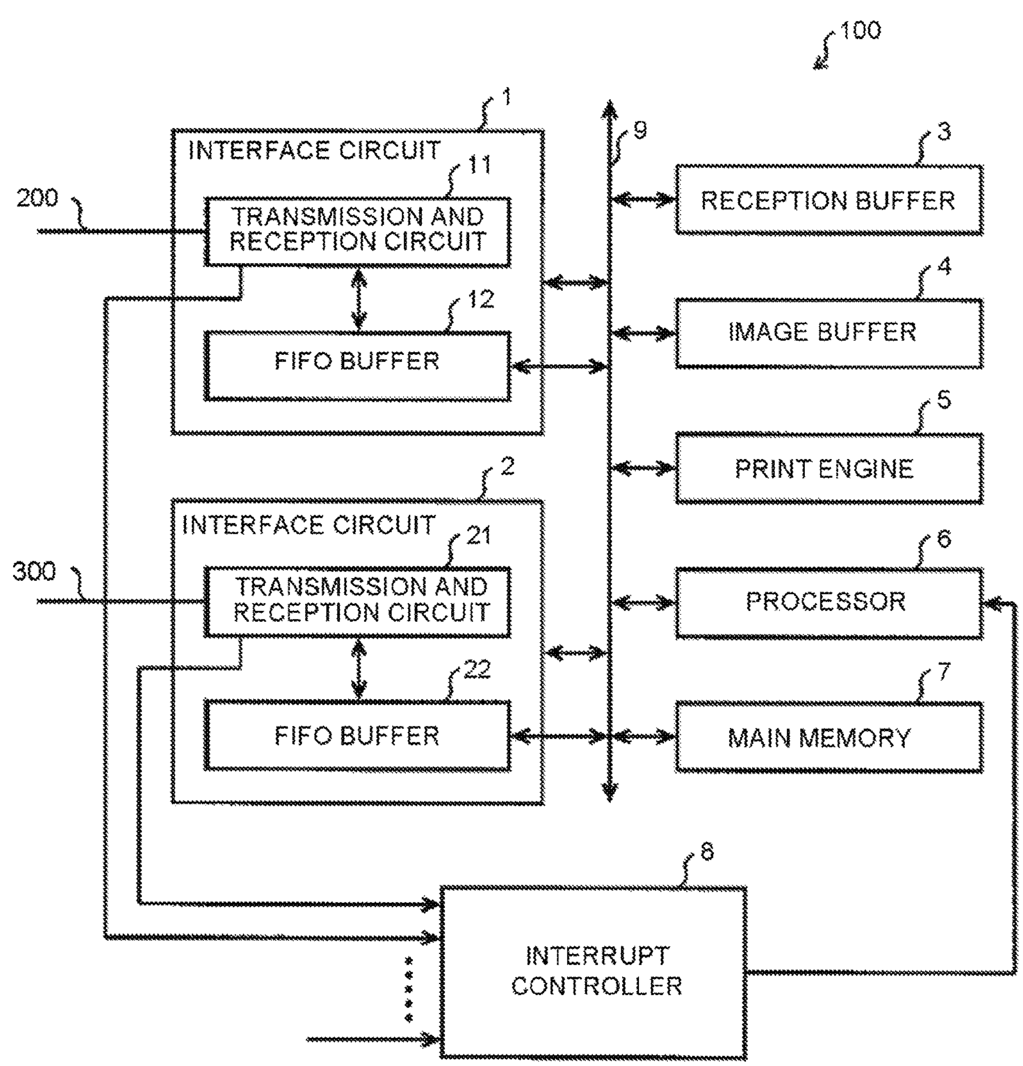
FIG. 1 is a block diagram illustrating the circuit constitution of the main parts of a printer according to an embodiment.

FIG. 1 is a diagram illustrating the circuit constitution of the main parts of a printer 100 according to the present embodiment.

The printer 100 includes interface circuits 1 and 2, a reception buffer 3, an image buffer 4, a print engine 5, a processor 6, a main memory 7, an interrupt controller 8 and a system bus line 9. FIG. 1 mainly shows elements necessary for describing the characteristic structure and operation of the present embodiment, and may include another element of another known printer of the same type or any other optional elements.

The interface circuits 1 and 2 transmit and receive data to and from another information processing apparatus via transmission paths 200 and 300 under a predetermined communication standard. The communication standard may be a known standard such as a USB (universal serial bus), RS-232, Ethernet (registered trademark), Wi-Fi or the like, or a unique standard different therefrom. Therefore, both cases in which the transmission paths 200 and 300 are wired and wireless are assumed. The interface circuits 1 and 2 may conform to the same standard or may conform to different standards. However, both of the interface circuits 1 and 2 conform to a standard for transmitting packetized data in the transmission paths 200 and 300. Tag IDs which are identification codes for identifying respective interface circuits are preliminarily assigned to the interface circuits 1 and 2. The assignment of the tag ID may be arbitrarily performed by, for example, a designer or a user of the printer 100.

The interface circuit 1 includes a transmission and reception circuit 11 and a FIFO (first-in, first-out) buffer 12.

The transmission and reception circuit 11 executes a processing defined by a communication standard to which the interface circuit 1 conforms on a transmission signal arriving via the transmission path 200 to extract received packets. The transmission and reception circuit 11 writes the received packet in the FIFO buffer 12 and requests the interruption controller 8 for interruption. The transmission and reception circuit 11 obtains the transmission signal as a transmission target by executing a processing defined by the communication standard to which the interface circuit 1 conforms on transmitted packets written in the FIFO buffer 12. Then, the transmission and reception circuit 11 sends the transmission signal to the transmission path 200 according to a protocol defined by the communication standard to which the interface circuit 1 conforms.

The FIFO buffer 12 stores the received packets given from the transmission and reception circuit 11. The FIFO buffer 12 sends the stored received packets to the system bus line 9 in the order in which they are stored under the control of the processor 6. The FIFO buffer 12 stores the transmitted packets given via the system bus line 9 under the control of the processor 6. The FIFO buffer 12 gives the stored transmitted packets to the transmission and reception circuit 11 in the order in which they are stored according to an instruction from the transmission and reception circuit 11.

The interface circuit 2 includes a transmission and reception circuit 21 and a FIFO buffer 22.

The transmission and reception circuit 21 executes a processing defined by a communication standard to which the interface circuit 2 conforms on a transmission signal arriving via the transmission path 300 to extract received packets. The transmission and reception circuit 21 writes the received packet in the FIFO buffer 22 and requests the interruption controller 8 for interruption. The transmission and reception circuit 21 obtains the transmission signal as a transmission target by executing a processing defined by the communication standard to which the interface circuit 2 conforms on transmitted packets written in the FIFO buffer 22. Then, the transmission and reception circuit 21 sends the transmission signal to the transmission path 300 according to a protocol defined by the communication standard to which the interface circuit 2 conforms.

The FIFO buffer 22 stores the received packets given from the transmission and reception circuit 21. The FIFO buffer 22 sends the stored received packets to the system bus line 9 in the order in which they are stored under the control of the processor 6. The FIFO buffer 22 stores the transmitted packets given via the system bus line 9 under the control of the processor 6. The FIFO buffer 22 gives the stored transmitted packets to the transmission and reception circuit 21 in the order in which they are stored according to an instruction from the transmission and reception circuit 21.

The reception buffer 3 stores the received packets obtained by the interface circuits 1 and 2. The reception buffer 3 has a capacity capable of saving a plurality of received packets.

The image buffer 4 copies or decompresses image data which is a printing object and temporarily stores it.

The print engine 5 prints an image indicated by the image data on a print medium such as a paper. A print engine 5 of a known system such as an electrophotographic system, a thermal transfer system, a thermal system, an impact dot system, or the like can be appropriately used.

The processor 6 and the main memory 7 constitute a computer that executes the information processing to control the printer 100. The processor 6 acts as a central part of the computer. The processor 6 controls each section constituting the printer 100 by executing various information processing according to an operating system, a firmware and an application program stored in the main memory 7.

The main memory 7 acts as a main memory part of the computer. The main memory 7 includes a nonvolatile memory area and a volatile memory area. The main memory 7 stores the operating system, the firmware, and the application program in the nonvolatile memory area. There is a case in which the main memory 7 stores data necessary for the processor 6 to execute a processing for controlling each section in a nonvolatile memory area or a volatile memory area. The main memory 7 uses the volatile memory area as a work area in which the data is appropriately rewritten by the processor 6.

In response to a request from each section such as the interface circuits 1 and 2, the interrupt controller 8 notifies interruption to the processor 6 according to a predetermined rule.

The interface circuits 1 and 2, the reception buffer 3, the image buffer 4, the print engine 5, the processor 6, and the main memory 7 are respectively connected to the system bus line 9. The system bus line 9 transmits various data and signals transmitted and received among these connected sections.

Next, the operation of the printer 100 configured as described above is described.

The printer 100 prints an image in response to a print request sent from another information processing apparatus via the transmission paths 200 and 300. However, another request for setting an operation condition of the printer 100 is transmitted from another information processing device in some cases. The request data for various requests is divided to be transmitted as the packets on the transmission paths 200 and 300.

The operation of a case in which the transmission signal for transmitting the packet reaches the interface circuit 1 via the transmission path 200 is described below.

In the interface circuit 1, the transmission and reception circuit 11 extracts the packets from the transmission signal arriving as described above. The transmission and reception circuit 11 writes the packet in the FIFO buffer 12 and requests the interrupt controller 8 for interruption.

The interrupt controller 8 notifies the processor 6 as an interruption from the interface circuit 1 if it becomes possible to notify the processor 6 of the request from the transmission and reception circuit 11.

If the transmission signal for transmitting the packet reaches the interface circuit 2 via the transmission path 300, the same operation as above is executed by the interface circuit 2 and the interrupt controller 8, and the packet is written in the FIFO buffer 22, and an interruption from the interface circuit 2 is notified to the processor 6.

In this way, if the interruption from the interface circuit 1 or the interface circuit 2 is notified, the processor 6 executes the information processing described below according to the firmware stored in the main memory 7.

Figure 2:
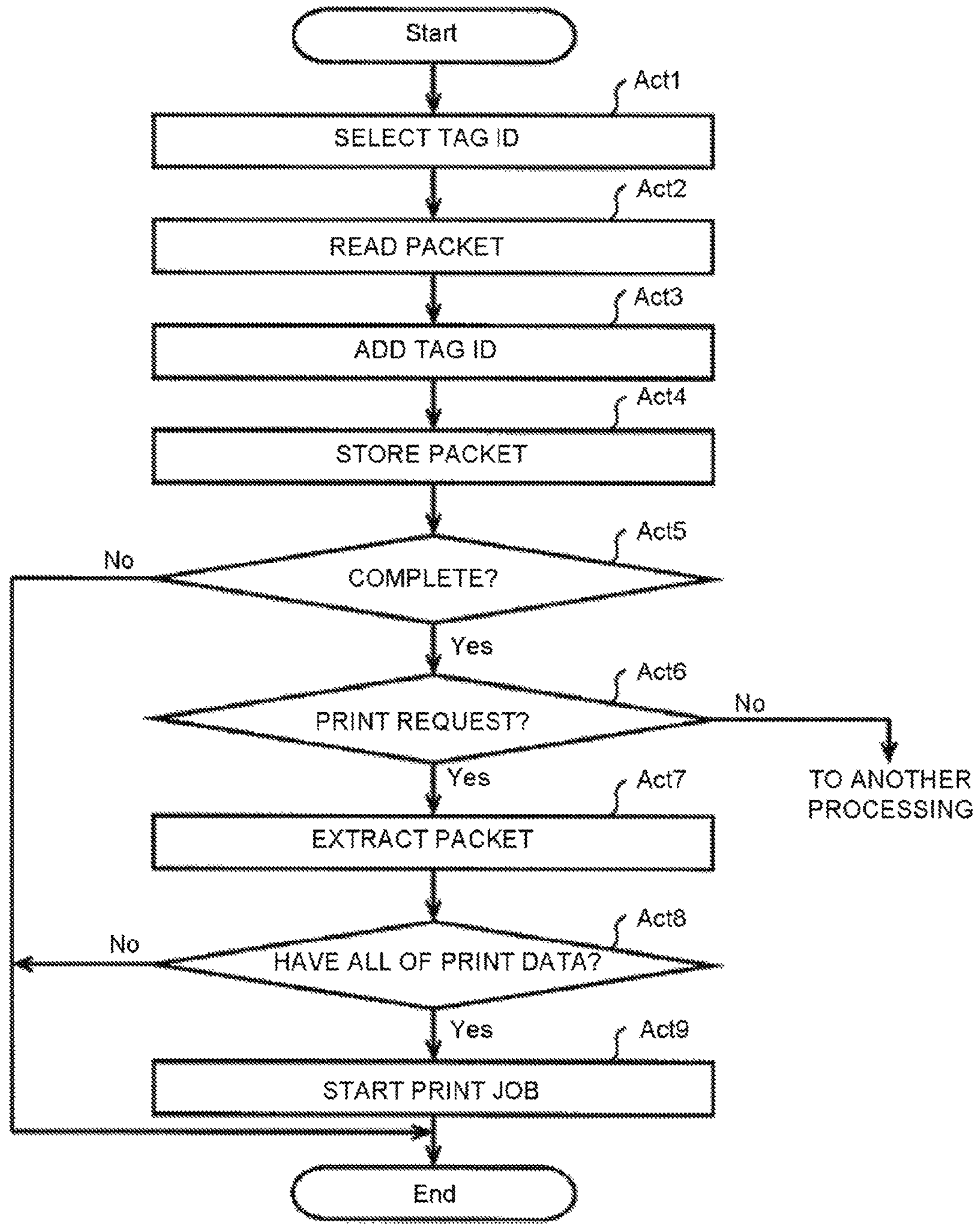
FIG. 2 is a flowchart depicting an information processing by a processor in FIG. 1.

FIG. 2 is a flowchart depicting the procedures of the information processing by the processor 6.

In Act 1, the processor 6 selects the tag ID assigned to the interface circuit 1.

In Act 2, the processor 6 reads the packet from the FIFO buffer 12 of the interface circuit 1.

In Act 3, the processor 6 adds the tag ID selected in Act 1 to the packet read in Act 2.

In Act 4, the processor 6 stores the packet to which the tag ID has already been added in the reception buffer 3.

In Act 5, the processor 6 confirms whether or not the reception of the request data which is the source of the packet stored in the reception buffer 3 is completed. If the processor 6 cannot receive all of the corresponding request data, the processor 6 determines No, and terminates the information processing shown in FIG. 2.

The packets based on the same request data are sequentially received by the interface circuit 1. Then, each time the packet is received, the processor starts the information processing shown in FIG. 2, and stores the packets in the reception buffer 3 after the packet is added with the tag ID of the interface circuit 1. During such a process, a packet based on another request data is received by the interface circuit 2 in some cases. In this case, the processor 6 stores the packet in the reception buffer 3 after the packet is added with the tag ID of the interface circuit 2 in the same way as described above.

If the last packet based on the request data is stored in the reception buffer 3 in Act 4, the processor 6 determines Yes in Act 5 and proceeds to the processing in Act 6.

In Act 6, the processor 6 confirms whether or not the request data of which reception has been completed requests the printing. If the request data does not request the printing, the processor 6 shifts to another processing for executing a processing in response to the request data. Another processing to be shifted here is, for example, a processing of updating data which is stored in the main memory 7 as data for indicating a setting value of an operation condition of the printer 100. Another processing to be shifted is, for example, a processing of updating the image data stored in the main memory 7 as image data indicating a store logo additionally printed on all the receipts at the time of printing a receipt.

If the request data for which the reception is completed requests the printing, the processor 6 determines Yes in Act 6 and proceeds to the processing in Act 7.

In Act 7, the processor 6 extracts the packet stored in the reception buffer 3 and added with the same tag ID as the packet stored in Act 4.

In Act 8, the processor 6 confirms whether or not all of the print data is included in the extracted packet. Then, the processor 6 determines No if there is omission in the print data, and terminates the information processing in FIG. 2. However, the processor 6 determines Yes if all of the print data is included, and proceeds to the processing in Act 9.

In Act 9, the processor 6 starts a print job for printing based on the above extracted packet. Then, the processor 6 terminates the information processing shown in FIG. 2. For example, the processor 6 executes the print job as another information processing. This information processing may be, for example, the same as the processing executed by another existing printer of the same type. For example, the processor 6 extracts the print data included in the extracted packet described above in a divided manner and copies or decompresses the image data on the image buffer 4 based on the extracted data. If the printing object is a receipt, the image data stored in the main memory 7 as the image data indicating the store logo may also be copied or decompressed on the image buffer 4. Then, the processor 6 controls the print engine 5 so as to print an image based on the image data copied or decompressed on the image buffer 4, for example.

If the transmission signal for transmitting the packet reaches the interface circuit 2 via the transmission path 300, the processor 6 processes the interface circuit 2 serving as a target in the same way as above. Although the detailed description is omitted, the processor 6 executes the processing according to the request data based on the packet extracted by using the tag ID even in the case of determining No in Act 6.

As described above, in the printer 100, the packets received by each of the interface circuits 1 and 2 can be stored in a mixed manner in the reception buffer 3. However, even in this case, according to the printer 100, it is possible to identify which one of the interface circuits 1 and 2 receives the packets with the tag ID, and extract the packet received by either one of the interface circuits 1 and 2. It is possible to share a single reception buffer 3 to receive data in parallel by each of the interface circuits 1 and 2. The, the printer 100 can execute the printing based on the data received in this way.

The following various modifications of the embodiment are possible.

The present embodiment can be realized as an interface device which executes an interface processing for another device having a function such as a print function for executing the processing in response to the request data indicated by the received packet by omitting such a function.

The present embodiment can be realized as a device having a function different from the print function as a function of executing a processing in response to the request data indicated by the received packet.

In addition to the interface circuits 1 and 2, the present embodiment can be realized as a device with one or more other the interface circuits.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An interface device, comprising:

a plurality of interface circuits, each respectively corresponding to a plurality of different transmission paths, configured to sequentially acquire a plurality of packets formed by dividing data which is an object of any one of plural types of information processing via the corresponding transmission paths;

a reception buffer; and a processor configured to associate the packet acquired by each of the plurality of the interface circuits with an identification code for identifying the interface circuit that acquired the packet, write the packet with a different identification code to the reception buffer in a mixed state, sequentially read a plurality of packets associated with the same identification code among the packets stored in the reception buffer from the reception buffer, and deliver the read packets to the information processing on the data which is a basis of the packet.

2. The interface device according to claim 1, wherein each interface circuit comprises a transmission and reception circuit and a first-in, first-out (FIFO) buffer.

3. The interface device according to claim 1 further comprising:

an image buffer configured to copy image data which comprises a printing object and temporarily store the image data.

4. The interface device according to claim 1 further comprising:

an image buffer configured to decompress image data which comprises a printing object and temporarily store the image data.

5. The interface device according to claim 1, wherein each packet comprises image data.

6. A printer, comprising:

a plurality of interface circuits, each respectively corresponding to a plurality of different transmission paths, configured to sequentially acquire a plurality of packets formed by dividing data which is an object of any one of plural types of information processing via the corresponding transmission paths;

a reception buffer;

a print engine configured to print an image on a print medium; and a processor configured to associate the packet acquired by each of the plurality of the interface circuits with an identification code for identifying the interface circuit that acquired the packet, write the packet with a different identification code to the reception buffer in a mixed state, sequentially read a plurality of packets associated with the same identification code among the packets stored in the reception buffer from the reception buffer, and start printing by the print engine by using the read packet.

7. The printer according to claim 6, wherein each interface circuit comprises a transmission and reception circuit and a first-in, first-out (FIFO) buffer.

8. The printer according to claim 6 further comprising:

an image buffer configured to copy image data which comprises a printing object and temporarily store the image data.

9. The printer according to claim 6 further comprising:

an image buffer configured to decompress image data which comprises a printing object and temporarily store the image data.

10. The printer according to claim 6, wherein the reception buffer stores the acquired packets.

11. The printer according to claim 6, wherein each packet comprises image data.

12. The printer according to claim 6, wherein the print engine comprises an electrophotographic system, a thermal transfer system, a thermal system, or an impact dot system.

13. A method of print processing, comprising:

sequentially acquiring, by a device comprising a processor, a plurality of packets formed by dividing data which is an object of any one of plural types of information processing via different the transmission paths corresponding to a plurality of interface circuits;

associating, by the device, the packet acquired by each of the plurality of the interface circuits with an identification code for identifying the interface circuit that acquired the packet;

writing, by the device, the packet with a different identification code to a reception buffer in a mixed state;

sequentially reading, by the device, a plurality of packets associated with the same identification code among the packets stored in the reception buffer from the reception buffer; and delivering, by the device, the read packets to information processing on the data which is a basis of the packet.

14. The method of print processing according to claim 13 further comprising:

printing an image indicated by image data on a print medium.

15. The method according to claim 14, wherein printing is carried out by electrophotographic printing, thermal transfer printing, thermal printing, or an impact dot printing.

16. The method according to claim 13 further comprising:

copying image data which comprises a printing object and temporarily storing the image data.

17. The method according to claim 13 further comprising:

decompressing image data which comprises a printing object and temporarily storing the image data.

18. The method according to claim 13 further comprising:

storing the acquired packets.

19. The method according to claim 13, wherein each packet comprises image data.

* * * * *